US009757773B2

(12) United States Patent
Nordlund et al.

(10) Patent No.: US 9,757,773 B2
(45) Date of Patent: Sep. 12, 2017

(54) ENGINE WASH COLLECTOR

(71) Applicant: EcoServices, LLC, Wethersfield, CT (US)

(72) Inventors: Sebastian Nordlund, Sundbyberg (SE); Robert M. Rice, Huntsville, AL (US); Niklas Linderholm, Ronninge (SE)

(73) Assignee: EcoServices, LLC, Wethersfield, CT (US)

( * ) Notice: Subject to any disclaimer, the term of this patent is extended or adjusted under 35 U.S.C. 154(b) by 18 days.

(21) Appl. No.: 14/776,450

(22) PCT Filed: Mar. 14, 2014

(86) PCT No.: PCT/US2014/028255
§ 371 (c)(1),
(2) Date: Sep. 14, 2015

(87) PCT Pub. No.: WO2014/144023
PCT Pub. Date: Sep. 18, 2014

(65) Prior Publication Data
US 2016/0030983 A1 Feb. 4, 2016

Related U.S. Application Data

(60) Provisional application No. 61/789,028, filed on Mar. 15, 2013.

(51) Int. Cl.
*B01D 46/00* (2006.01)
*B08B 3/10* (2006.01)
(Continued)

(52) U.S. Cl.
CPC ............... *B08B 3/10* (2013.01); *B01D 45/08* (2013.01); *B08B 17/025* (2013.01); *B64F 5/30* (2017.01);
(Continued)

(58) Field of Classification Search
CPC ....... F01D 25/002; B08B 3/02; B08B 17/025; B08B 9/00; B08B 3/10; B64F 5/30;
(Continued)

(56) References Cited

U.S. PATENT DOCUMENTS 4,010,790 A * 3/1977 Varga ........................ E06B 9/15
160/133
4,089,100 A * 5/1978 Berry, Jr. ................ E21B 19/18
175/85

(Continued)

FOREIGN PATENT DOCUMENTS

WO WO2006/107476 A1 10/2006
WO WO2008/025940 A1 3/2008

OTHER PUBLICATIONS

International Search Report and Written Opinion from PCT Application Serial No. PPCT/US2014/028255, dated Jul. 7, 2014, 15 pages.

*Primary Examiner* — Dung H Bui
(74) *Attorney, Agent, or Firm* — Westman, Champlin & Koehler, P.A.

(57) ABSTRACT

A collector for collecting wash liquid from an engine washing operation include a frame; a height adjustable and expandable droplet separator package connected to the frame, the droplet separator package to receive a flow of wash liquid entrained in an airstream emanating from an engine; a height adjustable and extendable chute with side walls and a scissor lift, the chute connected to the droplet separator package and extending at least partially under an engine to collect liquid exiting the engine; a collector tank connected to the frame to collect liquid from the droplet separator package and the chute; and a drainage pipe connecting at least one of the chute and the droplet separator to the collector tank.

19 Claims, 15 Drawing Sheets

(51) Int. Cl.
   *B01D 45/08* (2006.01)
   *F01D 25/00* (2006.01)
   *B08B 17/02* (2006.01)
   *B64F 5/30* (2017.01)
   *B08B 3/02* (2006.01)
   *B08B 9/00* (2006.01)
   *B01D 39/18* (2006.01)
   *B32B 5/26* (2006.01)

(52) U.S. Cl.
   CPC ............ *F01D 25/002* (2013.01); *B01D 39/18* (2013.01); *B08B 3/02* (2013.01); *B08B 9/00* (2013.01); *B32B 5/26* (2013.01); *B65H 2220/02* (2013.01); *B65H 2301/4472* (2013.01); *F05D 2220/32* (2013.01)

(58) Field of Classification Search
   CPC ........ F05D 2220/32; B65H 2301/4472; B65H 2220/02; B32B 5/26; B01D 39/18; B01D 45/08
   See application file for complete search history.

(56) References Cited

U.S. PATENT DOCUMENTS

| | | | | |
|---|---|---|---|---|
| 4,095,625 A * | 6/1978 | Marpe | ................... | B65G 69/186 141/286 |
| 4,221,256 A * | 9/1980 | Karaki | ................... | A44B 19/26 160/368.1 |
| 5,031,574 A * | 7/1991 | McDowell | ............ | A01K 1/007 119/448 |
| 6,612,359 B1 * | 9/2003 | Moreau | .................. | A01K 1/007 160/120 |
| 6,722,972 B1 * | 4/2004 | Holtkamp | .............. | A01K 1/007 119/448 |
| 6,766,849 B1 * | 7/2004 | Tseng | ........................ | A47H 1/19 160/332 |
| 8,277,647 B2 * | 10/2012 | Rice | ......................... | B08B 17/00 134/10 |
| 2002/0175881 A1 * | 11/2002 | Luoma | .................... | G06F 3/147 345/55 |
| 2005/0093339 A1 * | 5/2005 | Klassen | ................. | B62D 33/03 296/183.1 |
| 2006/0075620 A1 * | 4/2006 | Bussey, Jr. | ............. | E02B 11/00 29/429 |
| 2006/0075702 A1 * | 4/2006 | Billings | .................. | E04B 2/885 52/235 |
| 2006/0081521 A1 * | 4/2006 | Hjerpe | ...................... | B08B 3/02 210/171 |
| 2006/0219269 A1 * | 10/2006 | Rice | .......................... | B08B 3/02 134/34 |
| 2008/0149141 A1 | 6/2008 | Sales | | |
| 2008/0178909 A1 | 7/2008 | Alvestig et al. | | |
| 2008/0223403 A1 * | 9/2008 | Ford | ....................... | B64F 1/364 134/8 |
| 2009/0071516 A1 * | 3/2009 | Li | ........................... | F21V 21/34 135/16 |
| 2009/0159517 A1 | 6/2009 | Rice et al. | | |
| 2009/0283117 A1 * | 11/2009 | Blatch | ...................... | B64F 5/30 134/32 |
| 2010/0104365 A1 * | 4/2010 | Wood, II | ................... | B63C 3/12 405/3 |
| 2010/0242994 A1 * | 9/2010 | Amcoff | ..................... | B08B 3/00 134/10 |
| 2011/0083705 A1 * | 4/2011 | Stone | ........................ | B08B 3/02 134/109 |
| 2011/0181011 A1 * | 7/2011 | Merrill | ..................... | B60G 9/00 280/86.751 |
| 2011/0232697 A1 | 9/2011 | Amcoff et al. | | |
| 2011/0247501 A1 * | 10/2011 | Nordlund | .............. | F01D 25/002 96/187 |
| 2012/0036700 A1 * | 2/2012 | Mun | ......................... | B23P 21/00 29/428 |
| 2012/0090828 A1 * | 4/2012 | Webre | ..................... | E21B 17/026 166/77.53 |
| 2012/0104012 A1 * | 5/2012 | Cowie | ..................... | E05B 53/00 220/827 |
| 2012/0275087 A1 * | 11/2012 | Corey | ................... | A47B 91/005 361/679.01 |
| 2014/0034092 A1 | 2/2014 | Dorshimer et al. | | |
| 2014/0034130 A1 | 2/2014 | Dorshimer et al. | | |

* cited by examiner

ENGINE WASH COLLECTOR

BACKGROUND

In order to recover efficiency of the compressor of a gas turbine engine that have been contaminated during operation, engine compressors and turbine sections are routinely cleaned. Wash units connected to wash manifolds are used to spray wash fluid into the engine, most of the time utilizing deionized water or water and detergent mix. This washing of the engine removes contaminants from within the engine and produces a stream of contaminated effluent sprayed out of the engine, in the path of air exiting the engine and from specific engine drains. This wash effluent is contaminated with hydrocarbons, heavy metals and other dangerous materials for the environment and local biosystem. Airport regulations are globally becoming stricter with regards to engine washing and collection of effluent after washing procedure. National, regional and local airport environmental regulations are driving requirement to collect effluent during engine washing maintenance procedure.

SUMMARY

A collector for collecting wash liquid from an engine washing operation include a frame; a height adjustable and expandable droplet separator package connected to the frame, the droplet separator package to receive a flow of wash liquid entrained in an airstream emanating from an engine; a height adjustable and extendable chute with side walls and a scissor lift, the chute connected to the droplet separator package and extending at least partially under an engine to collect liquid exiting the engine; a collector tank connected to the frame to collect liquid from the droplet separator package and the chute; and a drainage pipe connecting at least one of the chute and the droplet separator to the collector tank.

A method of collecting wash liquid from an engine during a washing operation includes placing a collector with a frame relative to the engine; adjusting the height of a height adjustable droplet separator package connected to the frame to receive a flow of wash liquid entrained in an airstream emanating from the engine; adjusting the height of an extendable chute with side walls connected to the frame and to the droplet separator package to sit beneath the engine to collect liquid exiting the engine; and collecting wash effluent in a collector tank connected to the frame by separating the wash effluent from the mist exiting the engine with the droplet separator package and transporting wash liquid from the droplet separator package and from the chute to the collector tank.

DETAILED DESCRIPTION

Figure 1:
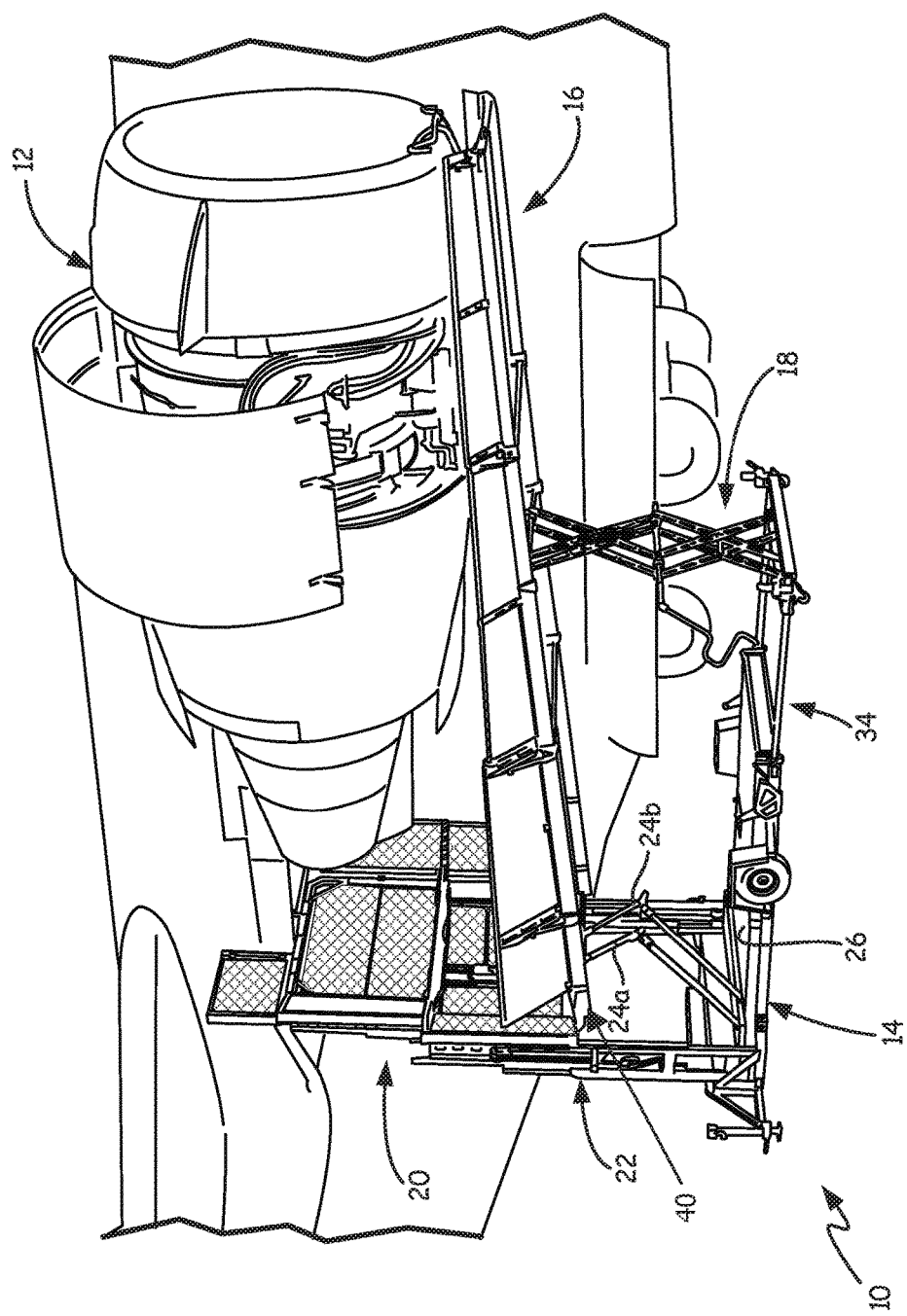
FIG. 1 shows a perspective view of a collector in use with an engine.

FIG. 1 shows a perspective view of collector 10 in use with engine 12. Collector 10 includes frame 14, extendable chute 16 with side walls 17 and scissor lift 18, droplet separator package 20 with lifting system 22, drainage pipes 24a, 24b and collector tanks 26. Chute 16 connects to frame 14 through scissor lift 18 and to droplet separator package 20. Droplet separator package 20 connects to frame 14 through lifting system 22. Drainage pipes 24a, 24b connect to chute 16 and droplet separator package 20 to collector tanks 26, which sits in frame 14. Collector 10 components can be made of non-corrosive and/or coated materials.

Frame 14 is on wheels, allowing for the positioning of collector 10 relative to (but not connecting to) engine 12 for collecting wash liquid during a wash operation. Front wheel pair is steerable. Chute 16 with side walls 17 extends and rises with scissor lift 18 on one end to set underneath engine to catch wash liquid from engine drains and other ports. Chute 16 is sloped so that wash liquid collected in chute 16 flows to drainage pipes 24a, 24b.

When performing a washing operation, engine is often cranked, which turns wash fluid into a mist when exiting engine 12. Droplet separator package 20 is raised with lifting system 22 to be positioned directly behind engine 12. Droplet separator package 20 removes the wash liquid entrained in the mist emanating from engine 12 during a washing operation, allowing air to exit. Wash effluent from droplet separator package 20 flows down and is transported to collector tanks 26 through fully enclosed drainage pipes 24a, 24b. Collector tanks 26 can then store wash effluent in frame 14 for proper disposal or treatment for reuse.

Collector 10 with extendable chute 16 with sidewalls 17 and droplet separator package 20 allows for the collection of waste liquid from an engine washing operation and temporary storage in collector tanks 26. By being able to raise and expand both droplet separator package 20 and chute 16, collector 10 is able to provide collection for any size engine 12 and aircraft configuration.

Figure 2A:
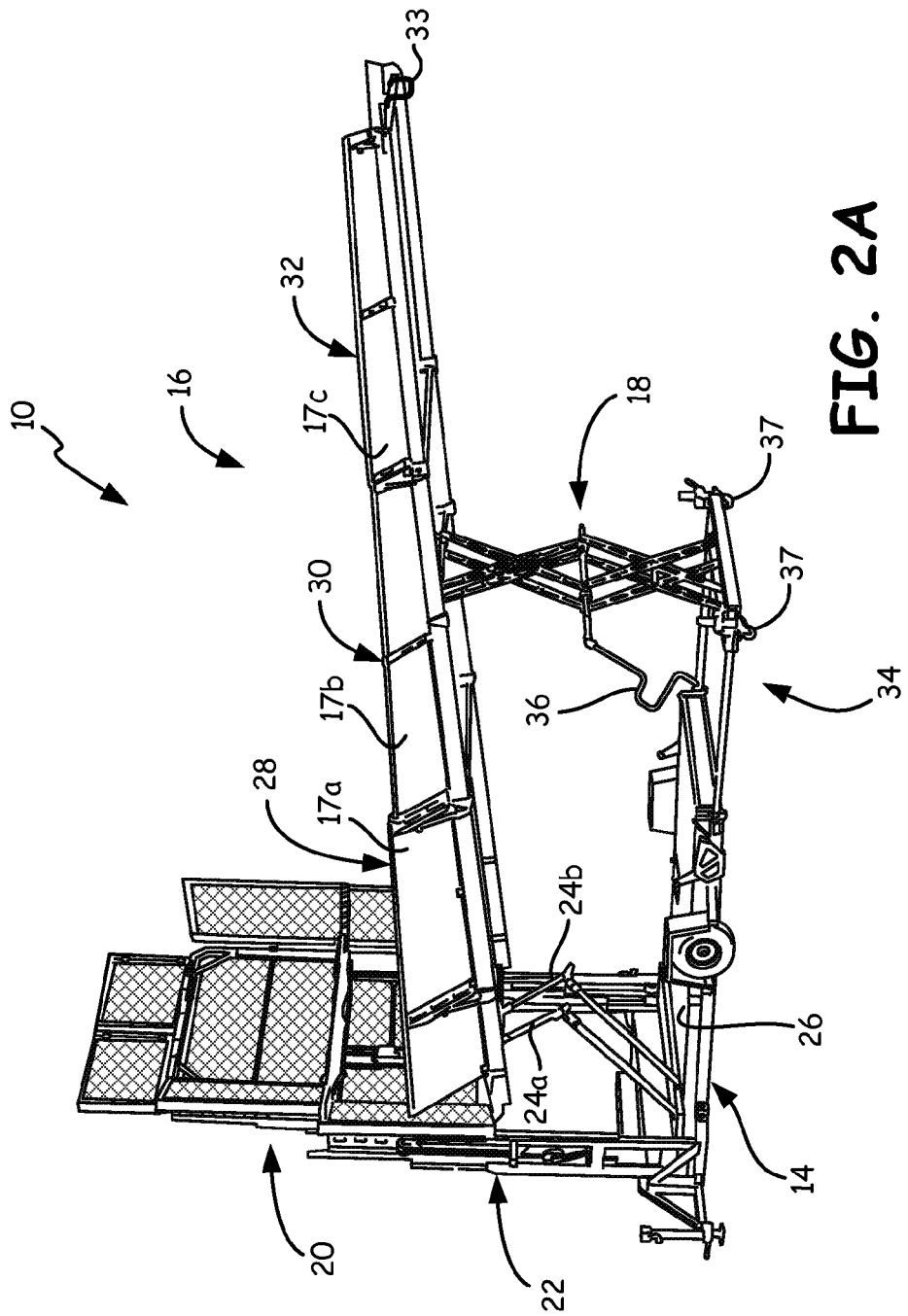
FIG. 2A shows a perspective view of the collector of FIG. 1 with a chute and droplet separator package fully extended and raised from the frame.
Figure 2B:
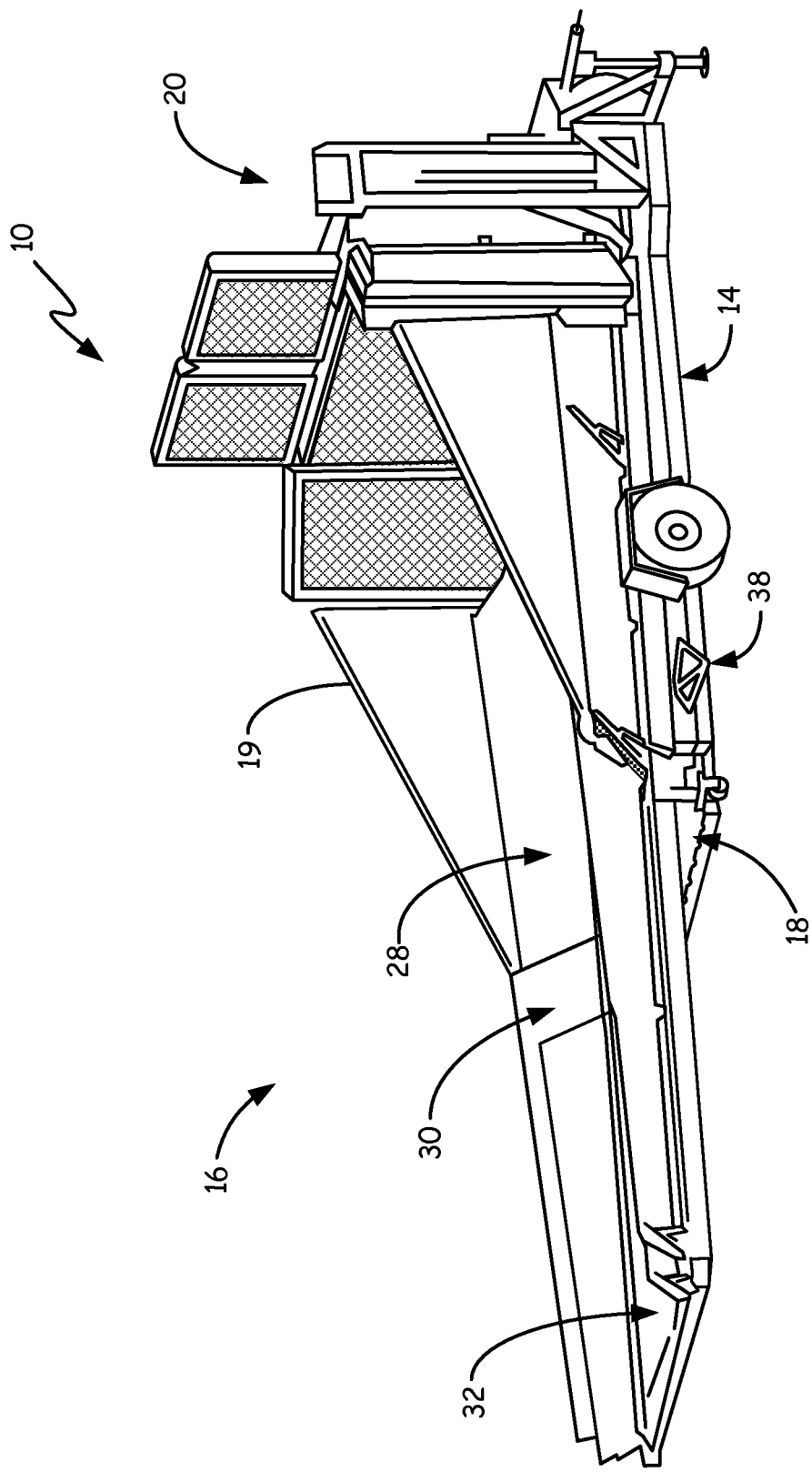
FIG. 2B shows a perspective view of the collector of FIG. 2A with the chute partially extended but not raised.
Figure 2C:
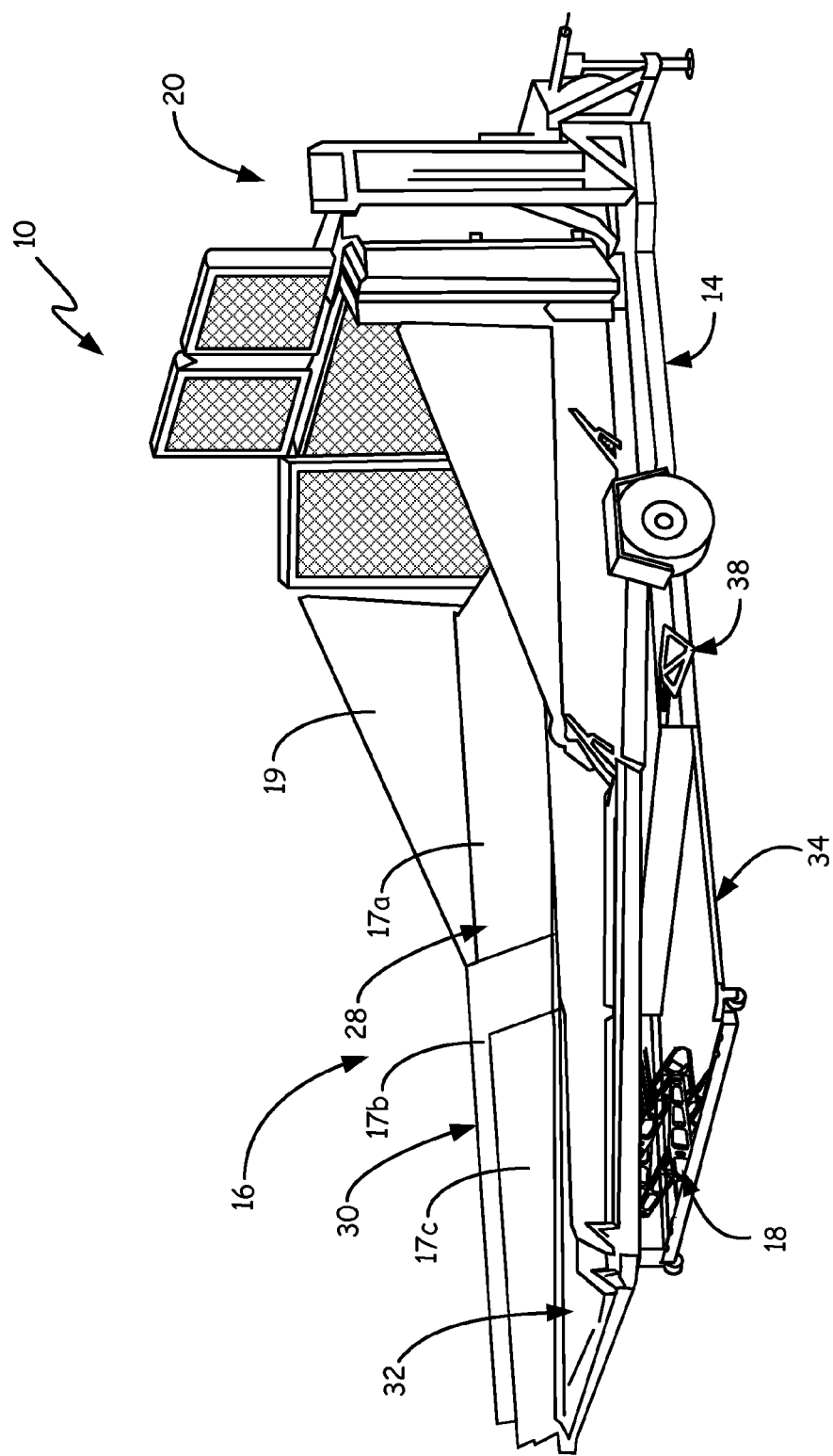
FIG. 2C shows a perspective view of the collector of FIG. 2B with a scissor lift extended from the frame and the chute partially raised.
Figure 2D:
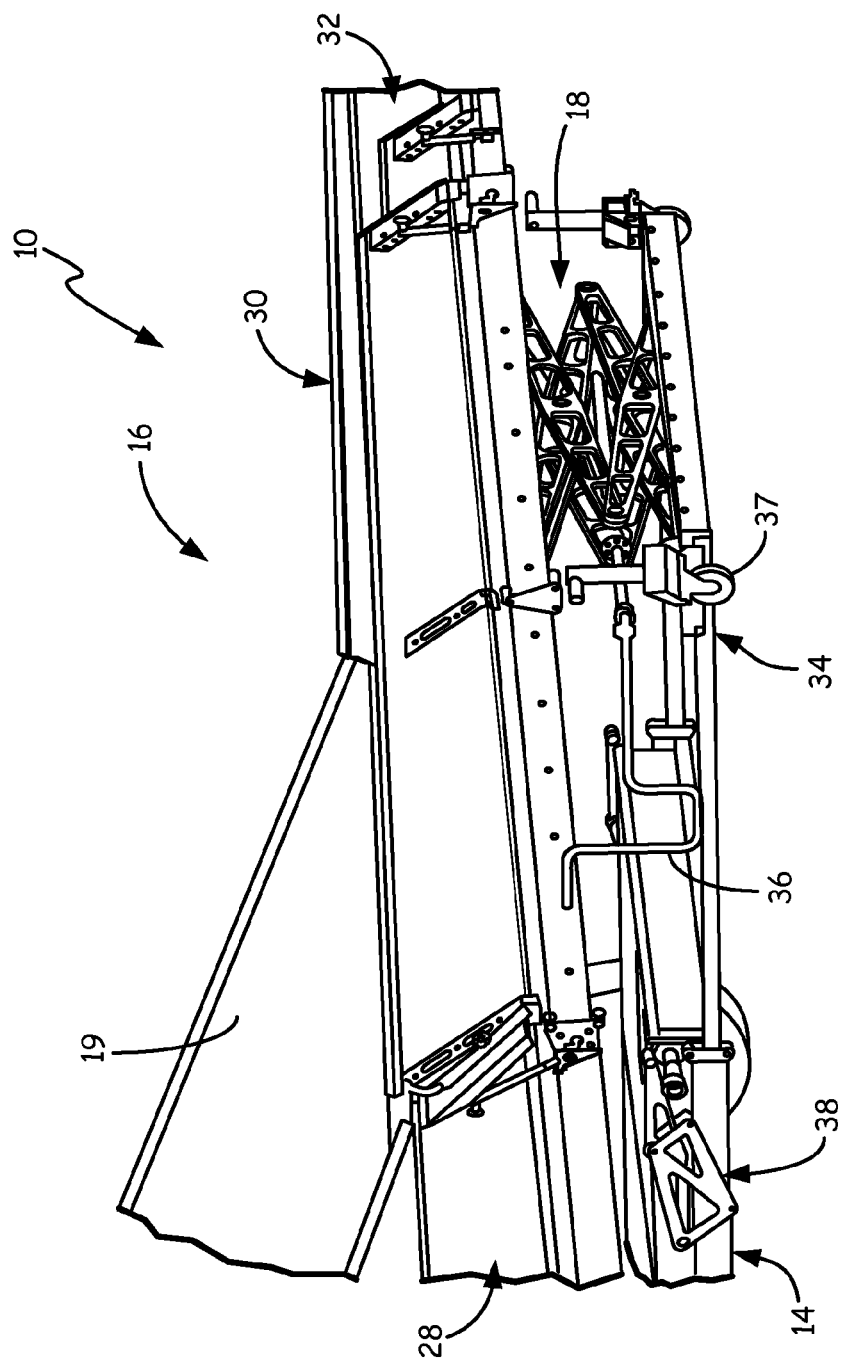
FIG. 2D shows a close-up side view of a lift portion of the chute and extended and partially raised scissor lift of FIG. 2C.

FIG. 2A shows a perspective view of collector 10 with chute 16 fully extended, scissor lift 18 fully raised from frame 14, and droplet separator package 20 fully extended and raised. FIG. 2B shows a perspective view of collector 10 with chute 16 partially extended but not raised, and FIG. 2C shows a perspective view of collector 10 with scissor lift 18 extended from the frame 14 and the chute 16 partially raised. FIG. 2D shows a close-up side view of portion of extended chute 16 and partially raised scissor lift 18 of FIG. 2C.

FIGS. 2A-2D include collector 10 with frame 14, extendable chute 16 with side walls 17 and scissor lift 18, droplet separator package 20 with lifting system 22, drainage pipes 24a, 24b and collector tanks 26. Extendable chute 16 includes scissor lift 18, panels 19, first stage 28 with side walls 17a, second stage 30 with side walls 17b, third stage 32 with side walls 17c, handle 33, scissor lift extension 34 on wheels, manual scissor lift crank 36, gas spring 38 for chute 16 vertical lifting, and chute 16 rotation point 40.

Chute 16 is extendable in three stages with third stage 32 fitting inside of and able to extend from second stage 30 and second stage able to fit inside of and extend from first stage 28. Second and third stages 30, 32 can be extended manually with handle 33. Third stage 32 can be locked in to second stage 30 for extending second stage only. Stages 28, 30, 32 can connect through sliding support beams or other methods. Each stage 28, 30, 32 includes side walls 17a, 17b, 17c that may be rotatable. Second and third stages 30, 32 can be locked through locking pins (not shown) so that chute 16 is secured once desired extension length has been achieved. Add-on side panels 19 can connect between side walls 17a, 17b, 17c and droplet separator package 20 sides to ensure enclosure of engine 12 during a collection operation.

Extendable chute 16 lift includes scissor lift 18, gas spring 38 for vertical chute 16 lifting and manual scissor lift 18 crank 36. When chute 16 is not lifted, as in FIG. 2B, the downward force on scissor lift 18 is very great. Thus, vertical force gas spring 38 can be actuated to act on chute 16 and assist in initial raising of chute 16, whereupon manual cranking of crank 36 can extend scissor lift 18, raising chute 16 to desired level and angle to sit beneath an engine. Gas spring 38 for vertical chute lifting can act on first stage 28 and may incorporate rollers to support chute 16 when lowered. Scissor lift 18 may be a multi-stage lift, with a central trapezoidal screw to reduce vertical force on scissor during lifting and reduce cranking force needed to crank trapezoidal screw. Trapezoidal screw can also act as a self locking device to maintain scissor lift 18 height position after completing cranking.

In the embodiment shown, scissor lift 18 connects to second stage 30 and includes extension 34 on wheels 37. Extension 34 moves scissor lift 18 out from the center of gravity when lifting chute 16, increasing the torque arm. This increase of the torque arm through extension of scissor lift 18 helps to reduce force on scissor lift 18, allowing for the use of manual crank 36. In other embodiments, scissor lift 18 could connect to other stages of chute 16.

Extendable chute 16 connects to droplet separator package 20 at pivot point 40 to raise with droplet separator package 20. This connection forms a seal to fully contain effluent during washing. Extendable chute 16 also raises with scissor lift 18. This allows extendable chute 16 to be raised at one or both ends and positioned and/or angled properly to collect wash liquid coming from an engine no matter the engine size, height and/or orientation.

Drainage pipe 24b then drains liquid collected by chute 16 to collector tanks 26. The ability to extend, raise, and tilt chute 16 provides for a more flexible system to collect and properly transport wash liquid from underneath an engine during a washing operation. Side walls 17a, 17b, 17c, which are extendable with chute 16 helps to ensure wash liquid is collected and does not run out sides of chute 16, so that it can be transported to collector tanks 26 where it can be properly disposed of and/or treated. Sidewalls 17a, 17b, 17c and additional enclosure panels, for example, panel 19, enclose engine 12 to ensure protection from side wind and compete collection of effluent during washing operations. Extendable scissor lift 18 and gas spring 38 and manually extendable stages 30, 32 ensure that chute can be raised, lowered and extended properly by manual force, making for a more flexible collector system which does not require electric power for operation. While chute 16 is shown with three stages 28, 30, 32, in other embodiments, chute 16 could have more or fewer stages. Additionally, other embodiments could have alternative lift mechanisms depending on system requirements.

Figure 3A:
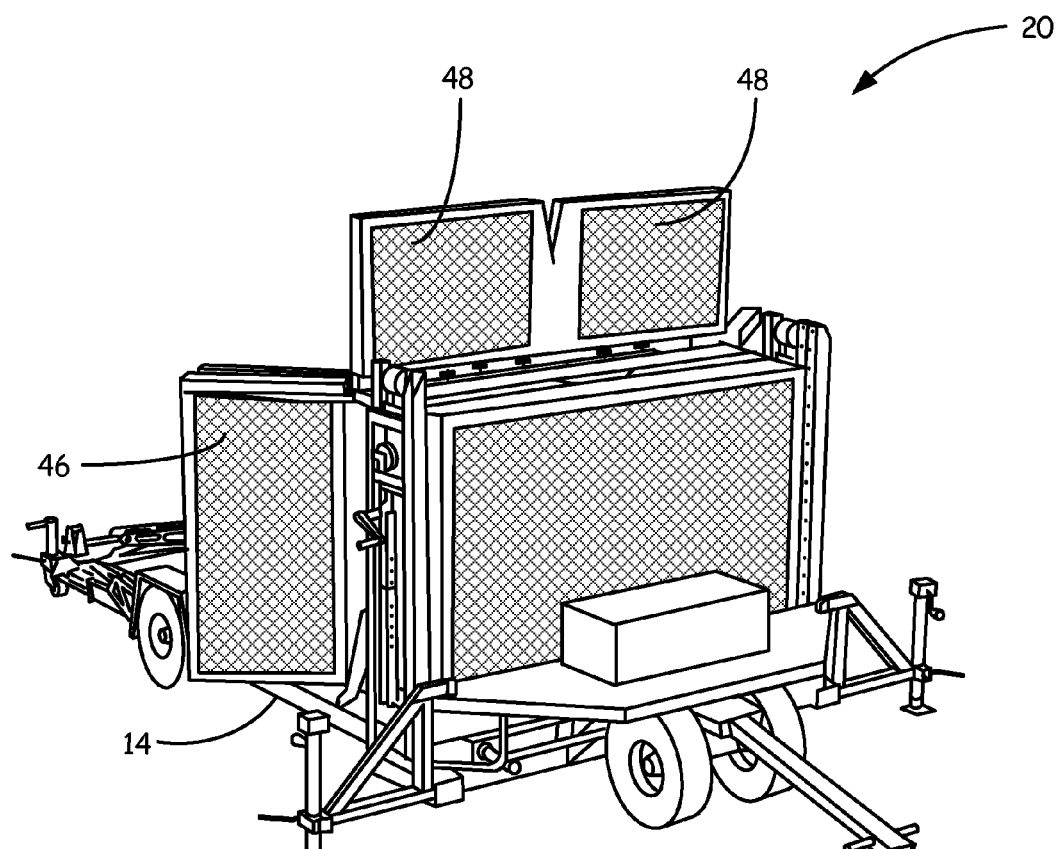
FIG. 3A shows a back perspective view of the droplet separator package of a collector.
Figure 3B:
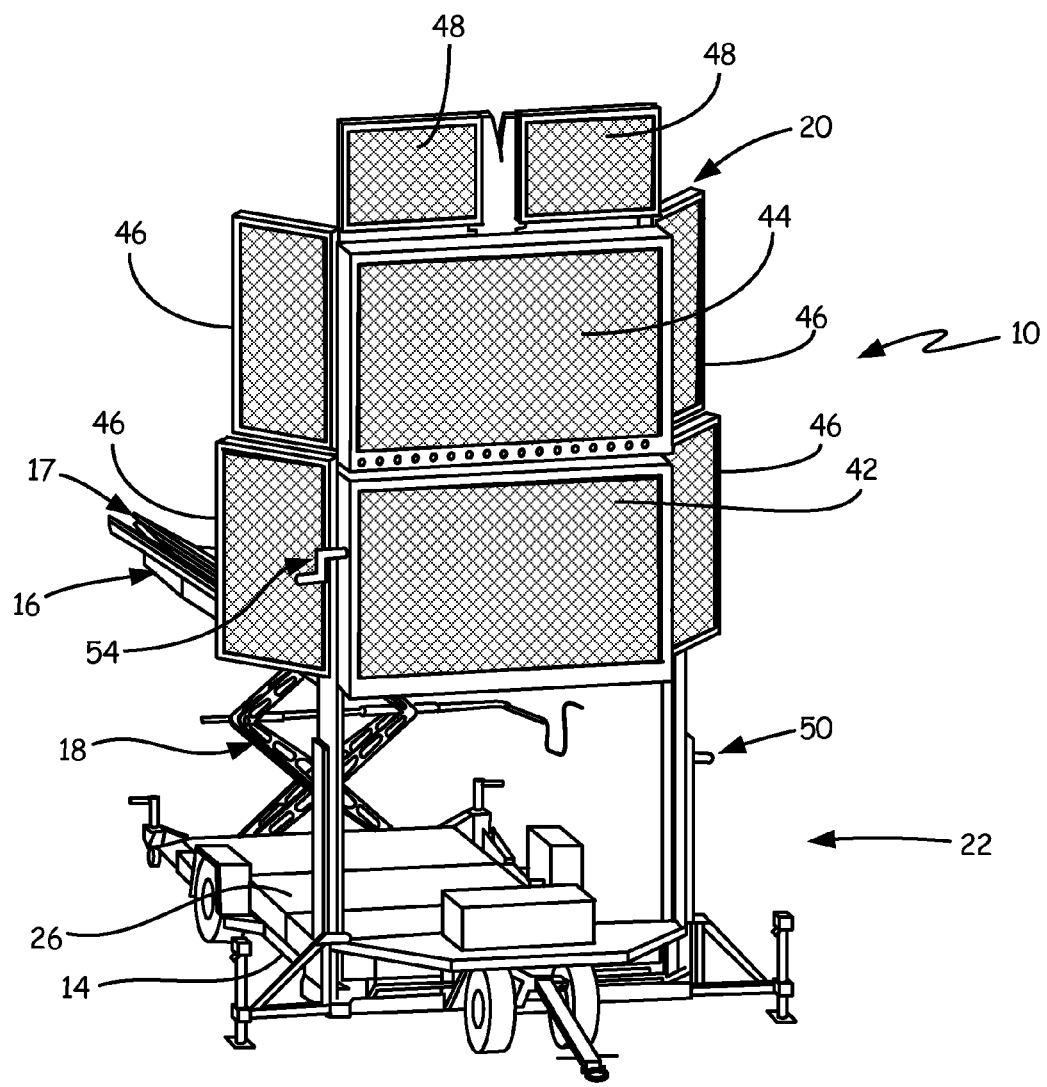
FIG. 3B shows a perspective view of the droplet separator package of FIG. 3A, with the droplet separator package fully raised.
Figure 3C:
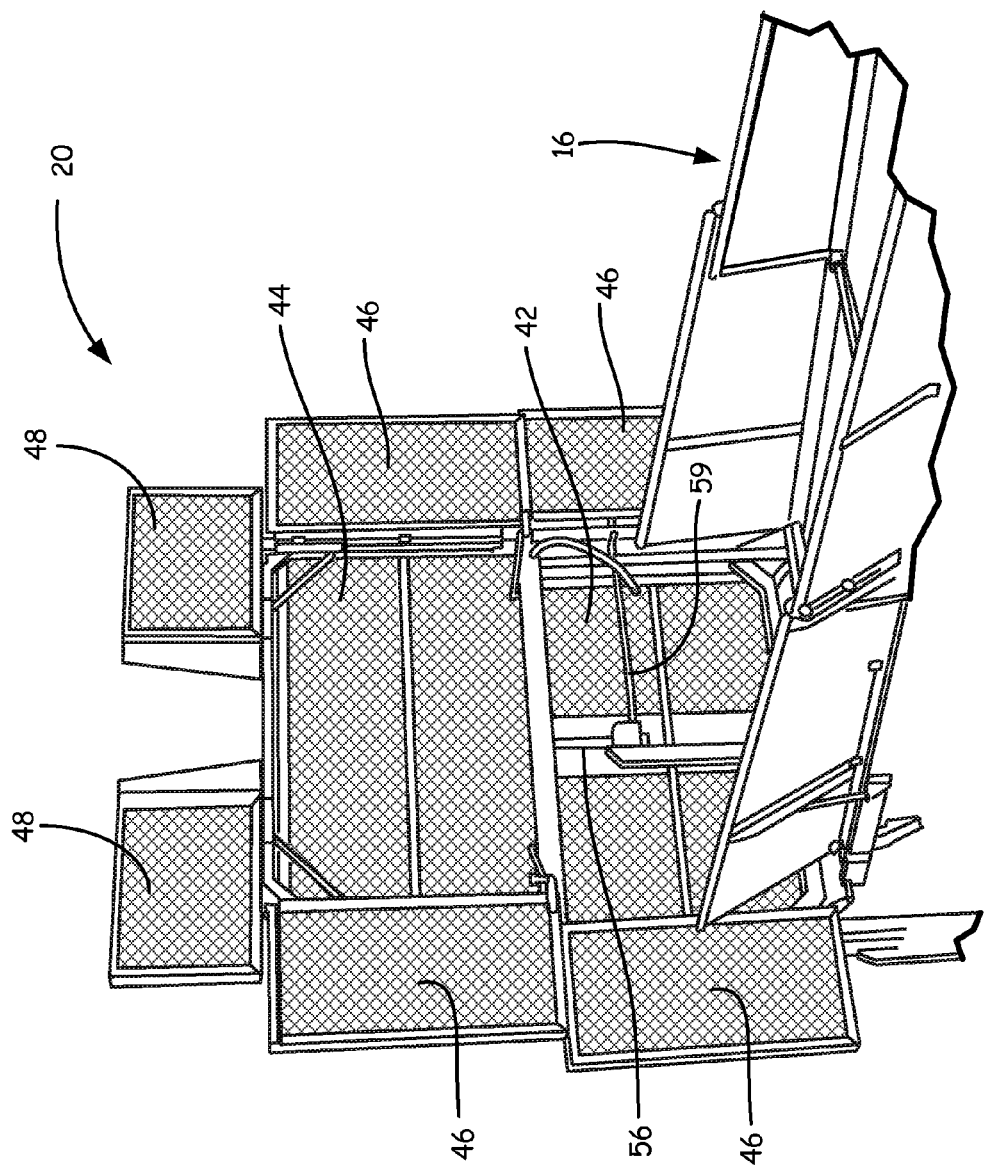
FIG. 3C shows a front perspective view of the droplet separator package of FIG. 3A.
Figure 3D:
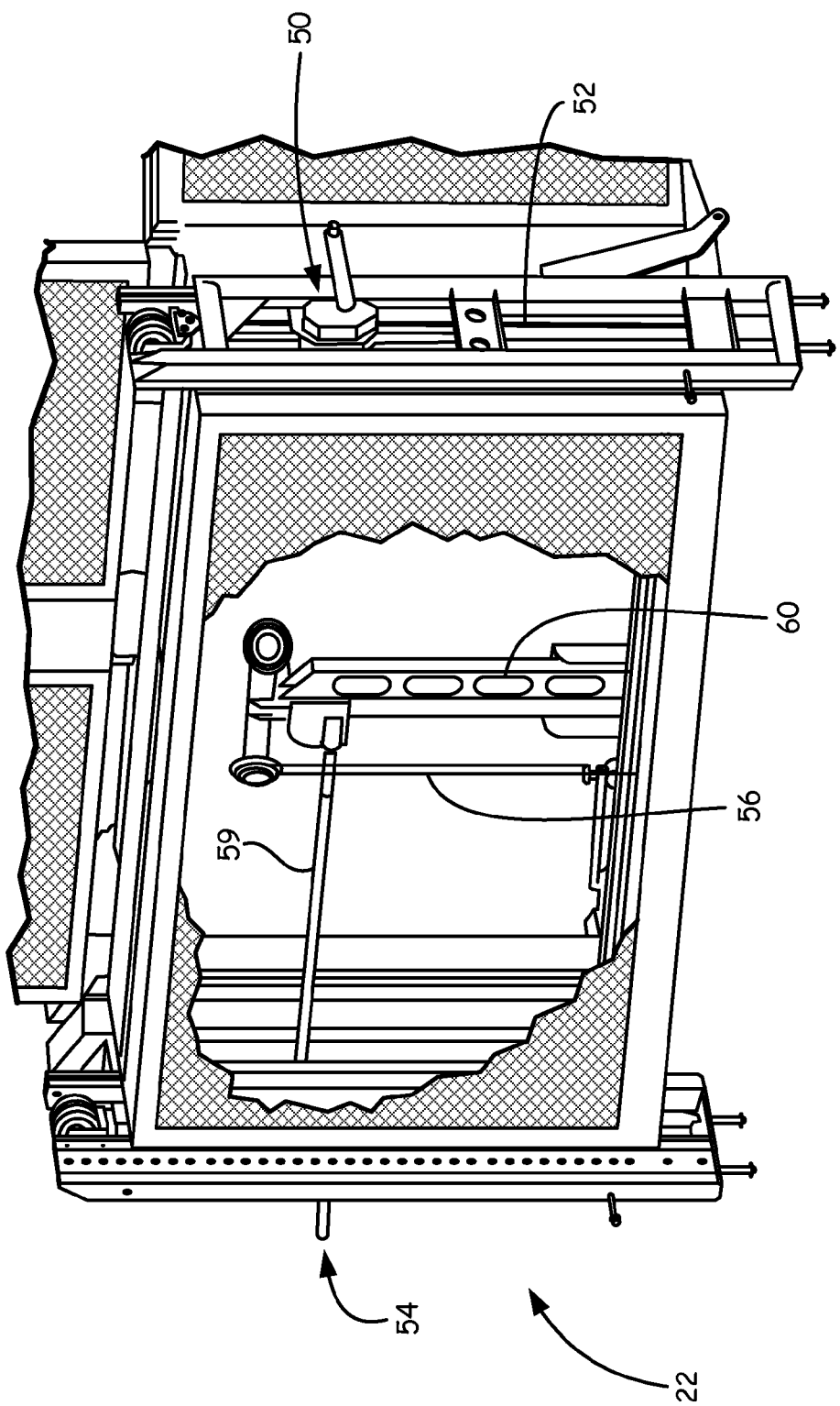
FIGS. 3D-3F show a close-up views of the lift system for the droplet separator package of FIG. 3A.
Figure 3E:
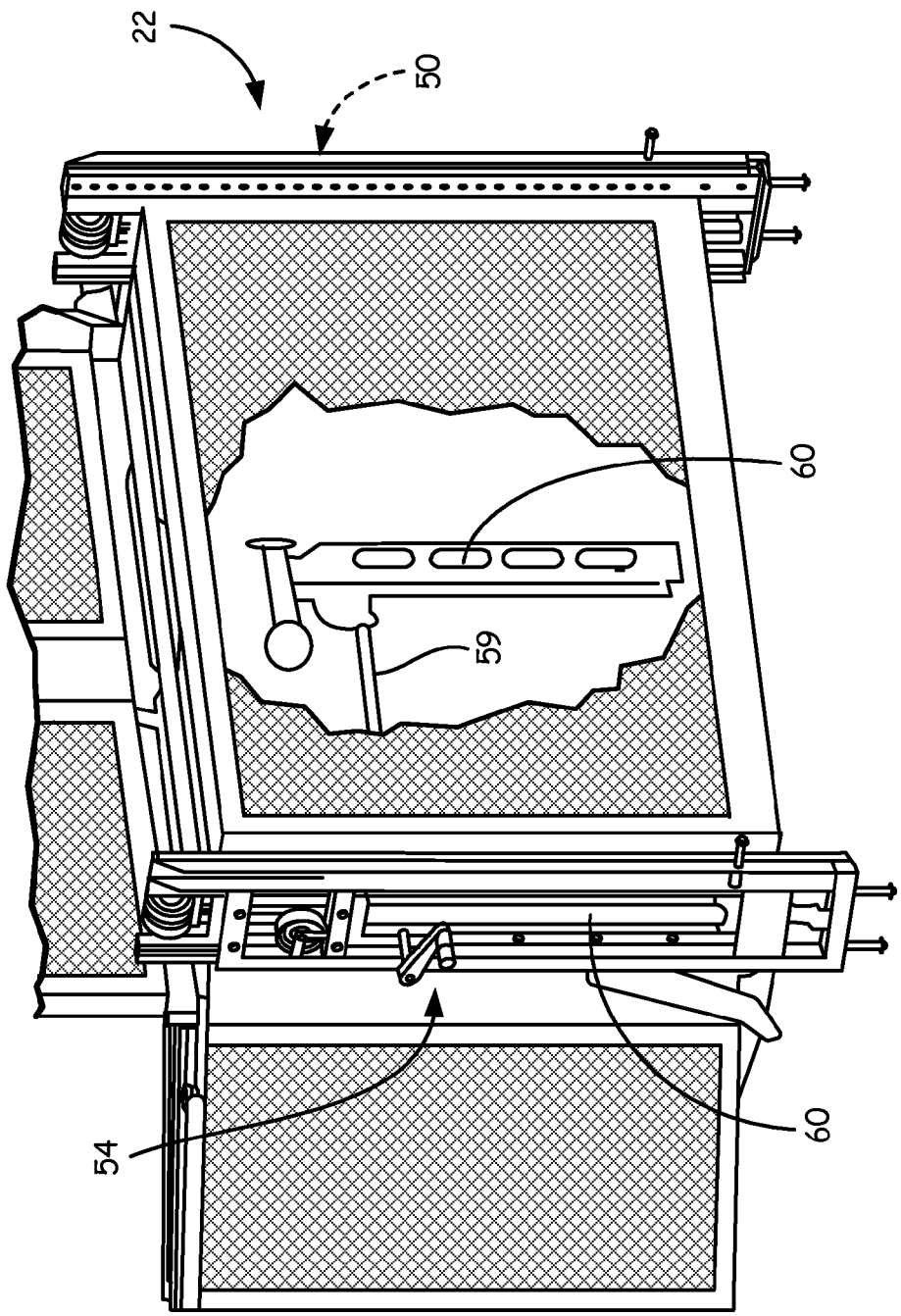
Figure 3F:
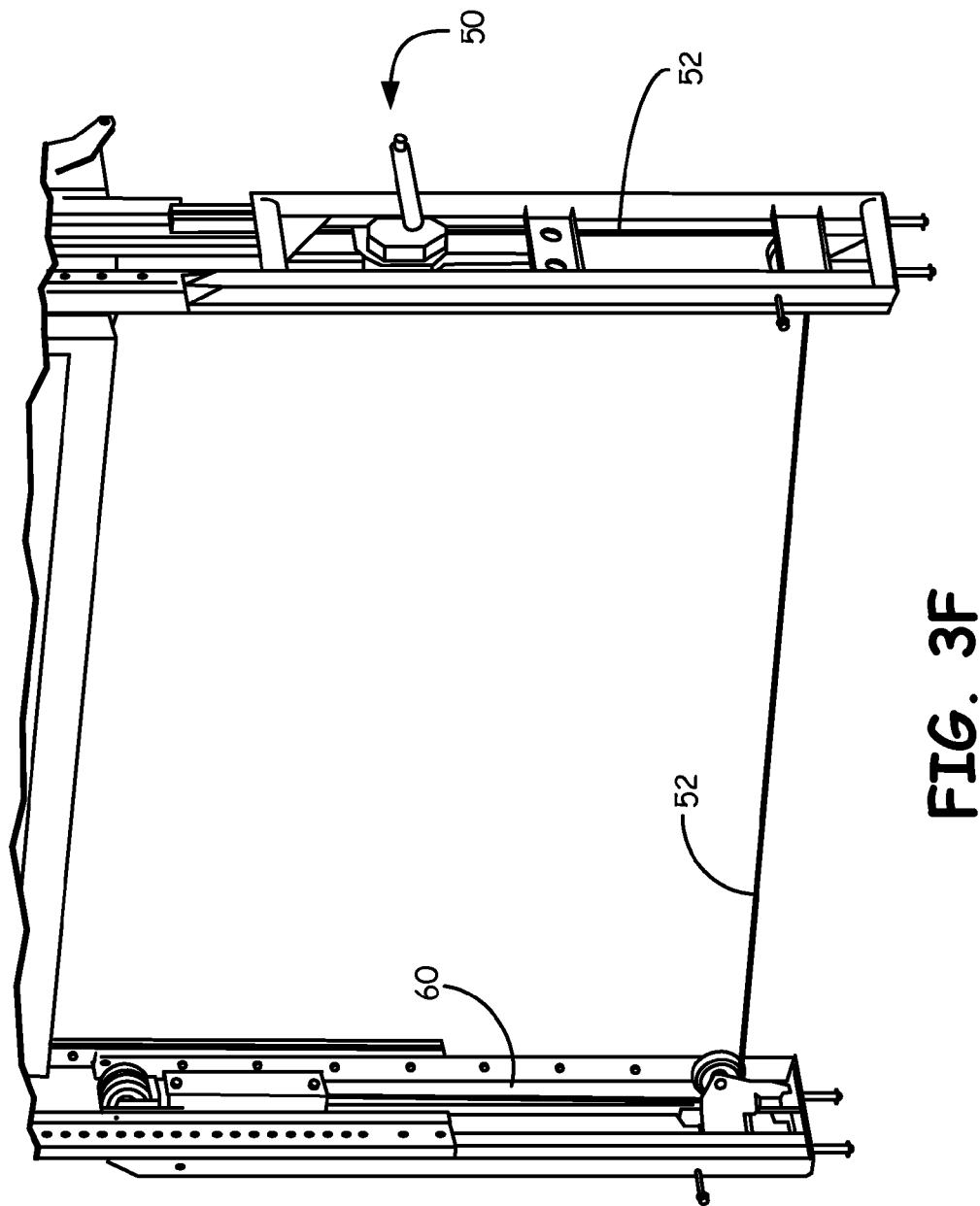
Figure 4:
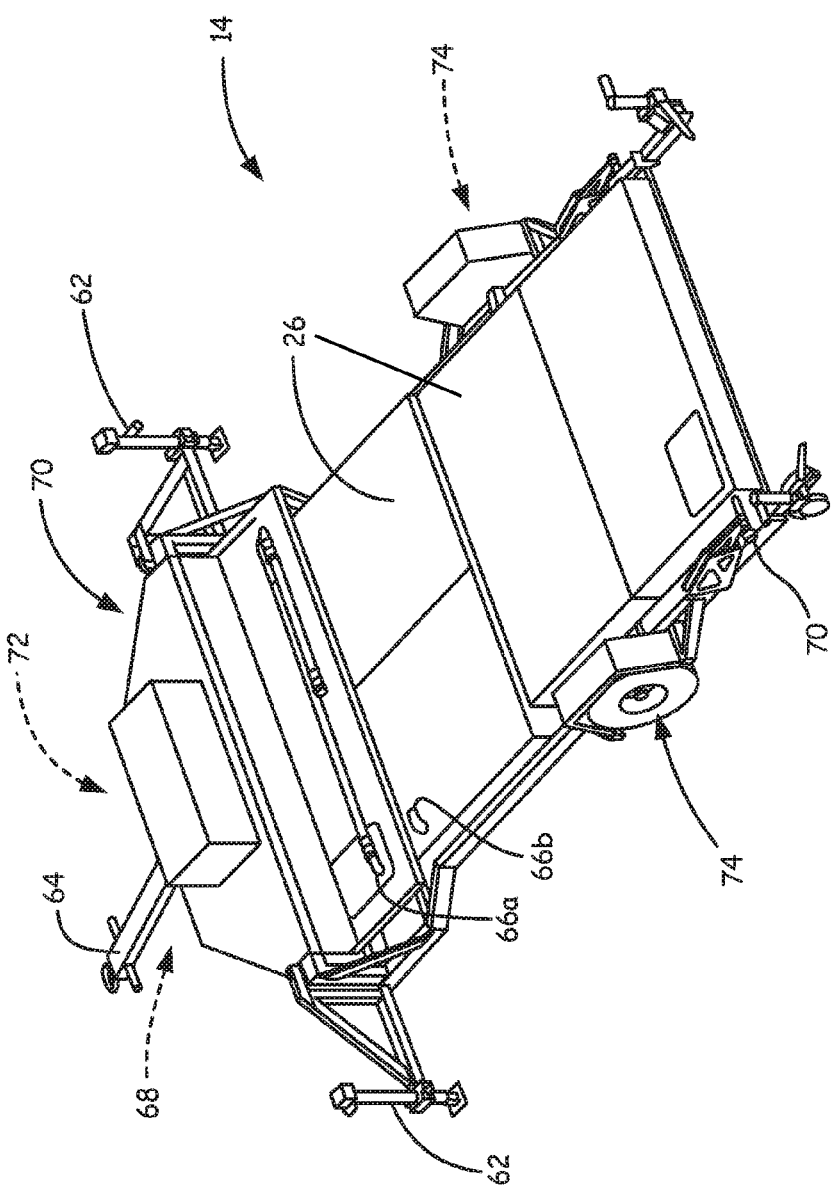
FIG. 4 shows a perspective view of the frame of collector of FIG. 1 without a droplet separator package, scissor lift and a chute.
Figure 5A:
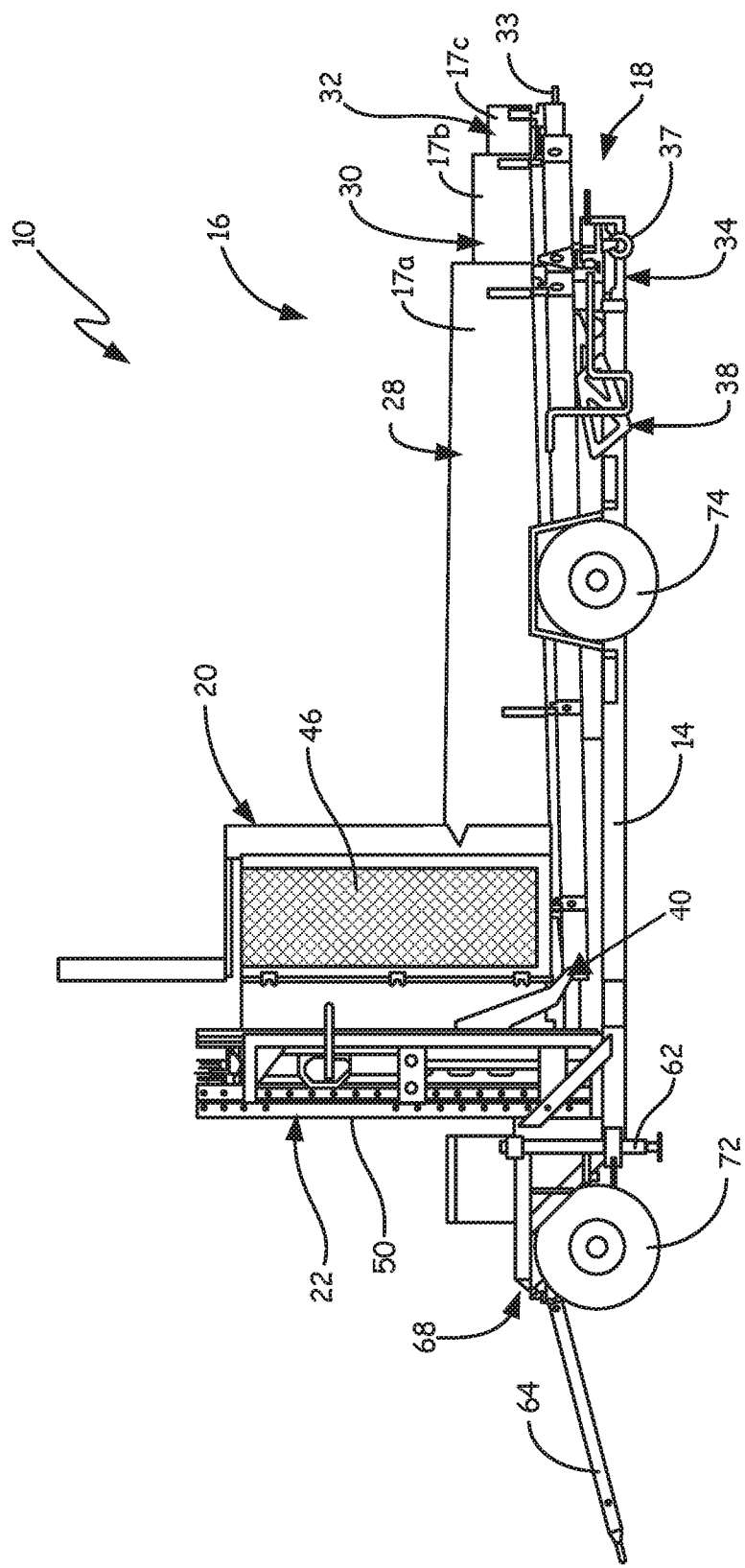
FIG. 5A shows a side view of a collector compacted.
Figure 5B:
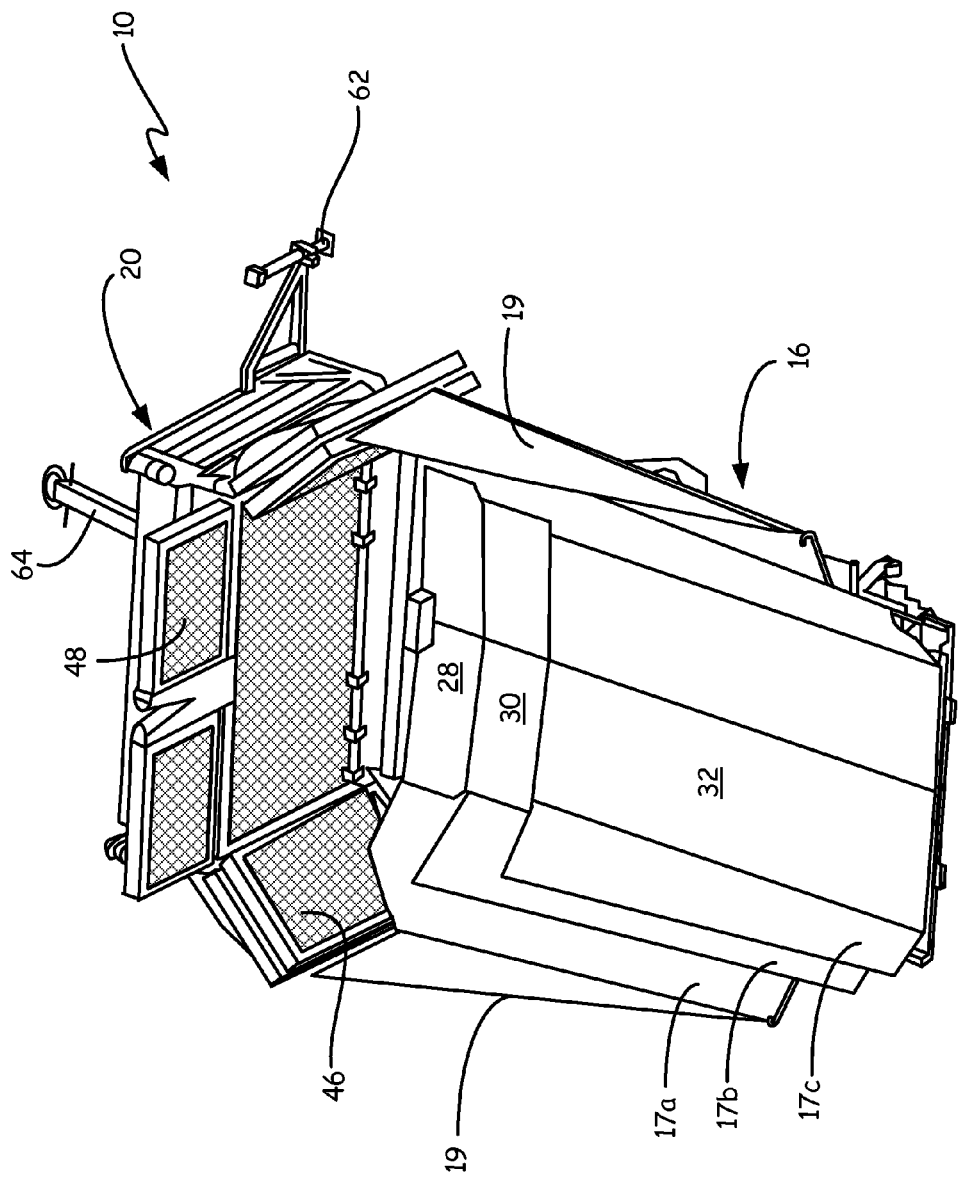
FIG. 5B shows a top perspective view of the collector of FIG. 5A.
Figure 5C:
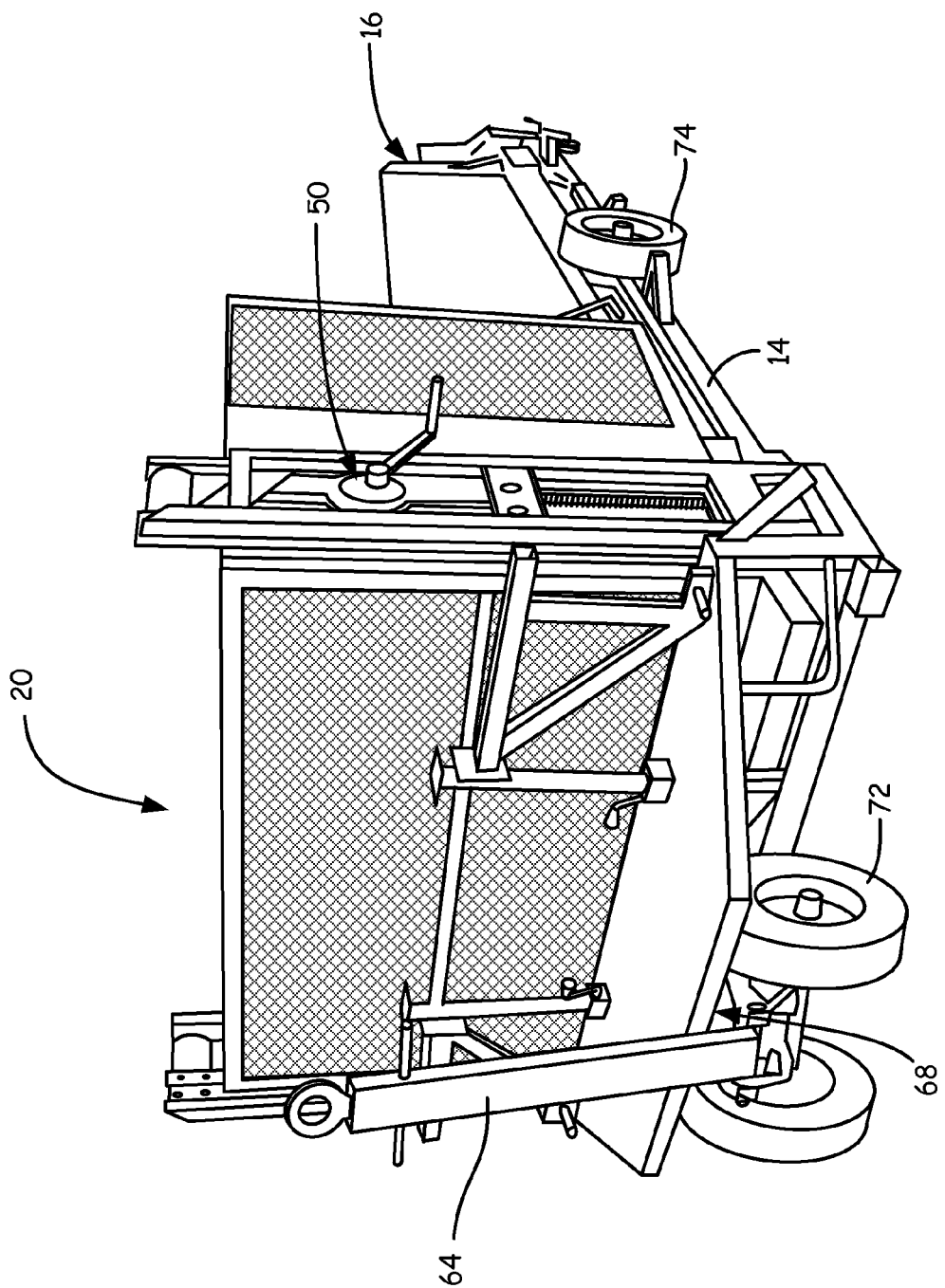
FIG. 5C shows a back view of a collector fully compacted.

FIG. 3A shows a back perspective view of the droplet separator package 20 of collector 10. FIG. 3B shows a back perspective view of droplet separator package 20, with droplet separator package 20 fully raised. FIG. 3C shows a front perspective view of droplet separator package 20. FIGS. 3D-3F show a close-up views of the lift system for the droplet separator package 20.

FIGS. 3A-3F include collector 10 with frame 14, extendable chute 16 with side walls 17 and droplet separator package 20 with lifting system 22. Droplet separator package 20 includes first main droplet separator 42, second main droplet separator 44, side droplet separator panels 46 and top droplet separator panels 48. Lifting system 22 includes first crank 50 with first lift linkage wire 52, second crank 54 with second lift wires 56, second crank linkage 58, slave lifting rod 59 and vertical assist gas springs 60. First crank 50 and a slave lifting rod 59 utilize individual wires on each side to lift first main droplet separator package 42 during cranking operation of first crank 50.

Side droplet separator panels 46 connect to and are extendable to the sides of first main droplet separator 42 and second main droplet separator 44. Top droplet separator panels 48 are connected to and extendable on top of second main droplet separator panel 44. Side droplet separator panels 46 and top droplet separator panels 48 can be moved manually and can include locking mechanisms (not shown) to lock the panels 46, 48 at the proper extension and orientation for a collection operation.

First lift linkage wire 52 connects to first (master) crank 50 and to slave lifting rod 59 (see FIGS. 3D, 3E and 3F). Master and slave use separate wires, per side, connected to first main droplet separator 42 for lifting operation. Second lift wire 56 connects to second crank 54 and to second main droplet separator 44. First lift linkage wire 52 acts to even out the vertical force between master and slave lift sides of droplet separators 42 when lifting. Gas springs 60 can be used to assist manual cranking with first and second cranks 50, 54.

When the first main droplet separator 42 is lifted, second main droplet separator 44 is also raised. A safety support (not shown) can be used with lift system 22 to ensure droplet separator package 20 is locked in position, for example to allow a maintenance operation.

First crank 54 with first lift linkage wire 52 raises first main droplet separator 42 and second main droplet separator 44 to a desired height for collecting wash liquid emanating from an engine in an airstream. Chute 16 is also lifted at one end with first crank 54, as it is pivotally connected at connection point 40 to first main droplet separator 42 to move vertically with first main droplet separator 42. Second crank 54 with lift wires 56 can then raise second main droplet separator 44 above first main droplet separator 42. Side panels 46 and/or top panels 48 can be individually moved to the sides and/or top of first main droplet separators 42 and/or second main droplet separator 44 to expand the collection area of droplet separator package 20.

Droplet separator package 20 collects spray of liquid exiting an engine during a wash operation. Wash liquid entrained in an airstream flows through a band of curved vanes in droplet separator package 20, subjecting the droplets to forces of inertia and directional flow changes. These forces divert the droplets from their original air flow, causing the droplets to stay within the droplet separator package 20 and collect at the bottom to flow through drainage pipe 24*a* (see FIGS. 1, 2A) to collector tanks 26.

Lift system 22 allows droplet separator package to be easily manually raised, allowing for a more versatile collector 10 which does not need power to operate. Having a plurality of main droplet separators 42, 44 as well as side extension panels 46 and top extension panels 48 allow the droplet separator package 20 to expand or contract to be able to meet area requirements for collection on an engine of any size. Lifting system 22 that can raise first droplet separator 42 and second main droplet separator 44 together or separately also allows collector to be able to vertically meet height requirements for collection from any engine.

FIG. 4 shows a perspective view of frame 14 of collector 10 without a droplet separator package 20 and without scissor lift 18 and chute 16 for viewing purposes. Frame 14 includes collector tanks 26, support legs 62, tow bar 64, drainage pipe connections 66*a*, 66*b*, turntable 68, outlets 70, front wheels 72 and rear wheels 74. Also shown is scissor lift 18.

Collector tanks 26 are fully enclosed in frame 14 and can include separate compartments which may or may not be connected. A plurality of compartments can make maintenance and cleaning of collector tanks 26 easier. Drainage pipe connections 66*a*, 66*b* receive drainage pipes 24*a*, 24*b* to transfer wash liquid collected into collector tanks 26. Outlets 70 can include a quick coupling for connecting to a hose, a treatment system or other device to allow for emptying of collector tanks 26.

Support legs 62 connect to and extend from each side of frame 14. Support legs 62 act to stabilize frame 14 and entire collector 10 during a washing operation. Support legs 62 extend from each side of frame 14 and are vertically adjustable to relieve stress on front wheels 72 and support collector 10. This can be helpful in situations where the ground may be uneven, inclined or adverse conditions are present, such as a strong wind.

Tow bar 64 connects to frame 14 at front axle. Front wheels 72 and axle connect to frame 14 through turntable 68. Mounting front wheels 72 and tow bar 64 on turntable 68 allow for easy manual maneuverability of collector 10. Front wheels 72 can also include a parking brake (not shown) that may be connected to the tow bar 64 position and act to ensure collector 10 does not move during a washing operation. For example, the parking brake can act on the front wheels 72 when the tow bar 64 is in a vertical position. Tow bar 64 may be held in that vertical position through the use of a locking pin, for example.

Frame 14 with fully enclosed collector tanks 26 and support legs 62 provides a stable and secure base to support collector 10 and store wash fluid during a washing operation. Turntable 68 and tow bar 64 allow for easy maneuvering of frame 14 and thus collector 10 as a whole, enabling manual placement at any engine washing location desired. The use of support legs 62 also allows for placement on uneven or inclined ground, where other collector systems may not be able to perform. Dual outlets 70 allow for quick and easy emptying of collector tanks 26 so that collection operations can be quickly resumed.

FIG. 5A shows a side view of collector 10 fully compacted, and FIG. 5B shows a top perspective view of the collector 10, and FIG. 5C shows a back view of collector 10 fully compacted. Collector 10 includes frame 14 (with support legs 62), extendable chute 16 (with scissor lift 18, first stage 28 with side walls 17*a*, second stage 30 with side walls 17*b*, third stage 32 with side walls 17*c*, handles 33, scissor lift extension 34 on wheels 37, manual crank 36, gas spring 38 for vertical chute 18 lifting and rotation point 40) and droplet separator package 20 (with lifting system 22, first main droplet separator 42, second main droplet separator 44, side droplet separator panels 46 and top droplet separator panels 48).

As seen in FIGS. 5A-5B, collector 10 can fold up so that third stage 32 with side walls 17*c* fits inside of second stage 30 with sidewalls 17*b* and second stage 30 with sidewalls 17*b* sits inside first stage 28 with sidewalls 17*a*. Side droplet separator panels 46 line up together as first main droplet separator 42 sits behind second main droplet separator 44. As shown in FIG. 5C, top panels 48 can fold down and side walls can be tilted to make collector 10 as compact as possible.

This folding up of collector 10 allows for easy transport and storage. Additionally, this allows for collector 10 to be very versatile, having extension portions in both chute 16 and droplet separator package 20 to expand to collect wash liquid from very large engines, while being able to compact to collect wash liquid from very small engines as well. Compaction also reduces the storage space required for collector 10.

In summary, collector 10 with extendable chute 16 with sidewalls 17 and expandable droplet separator package 20 is a versatile collector that can expand, raise and/or orient parts to collect liquid from a washing operation for any engine type and size and is manually operable. Frame 14 with tow bar 64 and turntable 68 allow for easy maneuvering of collector 10 to where an engine needs washing. Lifting system 22 and scissor lift 18 allow for vertical movement and/or tilting of chute 16. Scissor lift 18 with extension 34 and gas springs 38 allow for the manual crank 36 lifting of chute. Lifting system 22 with first main droplet separator 42 and second main droplet separator 44, manual cranks 50, 54 with lift wires 52, 56, lifting rod 59 and gas springs 60 allows for easy and stable manual raising of droplet separator package 20 and one end of chute 16. Pivotal connections (40) between droplet separator package 20 and chute 16 as well as chute 16 and scissor lift 18 allow for tiling of collector 10 components to adequately collect wash liquid and drain to drainage pipes 24*a*, 24*b*. Frame 14 with support legs 62 provide a stable base to support and stabilize collector 10 during wash operations despite environmental conditions and/or challenging terrain. Collector 10 allows for efficient collection of wash liquid from an engine operation for any engine type or size by providing a versatile droplet separator package 20 and chute 16 that can be easily towed to an engine 12 that needs washing, and then manually set up and operated, not requiring power to run. This makes for a more flexible system, as it can be easily transported to anywhere an engine 12 needs cleaning and does not require any connections to power sources or any physical connection to the engine. Thus, collector 10 provides for fully mechanical, safe, low maintenance effective and efficient collection of liquid during a washing operation and allows for washing of a wide range of aircraft and engine combinations without changing components.

While collector 10 and wheels 72 are shown as manually operated systems, in other embodiments, collector system could include an electrically powered system for movement of collector. While lifting system 22 and scissor lift 18 are both shown as manual crank lift systems, in other embodiments, lift systems could include an electrically powered actuator or hydraulic lift system.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A collector for collecting wash liquid from an engine washing operation, the collector comprising:
    a frame;
    a height adjustable and expandable droplet separator package connected to the frame, the droplet separator package to receive a flow of wash liquid entrained in an airstream emanating from an engine, wherein the droplet separator package comprises:
        a height adjustable first droplet separator; and
        a height adjustable second droplet separator;
    a height adjustable and extendable chute with side walls and a scissor lift, the chute connected to the droplet separator package and extending at least partially under an engine to collect liquid exiting the engine;
    a collector tank connected to the frame to collect liquid from the droplet separator package and the chute;
    a drainage pipe connecting at least one of the chute and the droplet separator package to the collector tank; and
    a droplet separator package lifting system, wherein the droplet separator package lifting system comprises:
        a first crank to lift the droplet separator package vertically; and
        a second crank to lift the second droplet separator above the first droplet separator wherein the droplet separator package lifting system includes a master element and a slave element, wherein the master element is connected to the first crank at a first side of the height adjustable first droplet separator and the slave element is connected to the second crank at an opposite second side of the height adjustable first droplet separator.

2. The collector of claim 1, wherein the height adjustable first droplet separator and the height adjustable second droplet separator are connected so that the second droplet separator raises with the first droplet separator and is adjustable.

3. The collector of claim 1, wherein first crank and the second crank each comprise a manual crank having a handle.

4. The collector of claim 1, and further comprising:
    gas springs connected to support the droplet separator package lifting system.

5. The collector of claim 1, and further comprising:
    a plurality of droplet separator side panels connected to the droplet separator package which are extendable to the sides of the droplet separator package.

6. The collector of claim 1, and further comprising:
    at least one droplet separator top panel connected to the droplet separator package and extendable above the droplet separator package.

7. The collector of claim 1, and further comprising gas springs to assist the droplet separator package lifting system and/or the scissor lift.

8. The collector of claim 1, wherein the droplet separator package is connected to the chute by a pivotal connection that causes one end of the chute to raise with the droplet separator package.

9. The collector of claim 1, and further comprising one or more additional collector tanks.

10. The collector of claim 1, and further comprising:
    a plurality of support legs connected to the frame.

11. The collector of claim 1, wherein the master element comprises a master lift wire that extends between the opposite first and second sides of the height adjustable first droplet separator.

12. The collector of claim 1, wherein the slave element comprises a slave lift wire connected to the second crank separate from the first crank.

13. The collector of claim 1, wherein the chute comprises:
    a plurality of retractable stages to adjust a length of the chute.

14. The collector of claim 13, wherein each stage of the plurality of retractable stages includes sidewalls.

15. The collector of claim 13, wherein the plurality of stages includes a second stage configured to fit inside of and extend from a first stage.

16. The collector of claim 1, wherein the scissor lift includes an extension to be extendable from the frame with the chute.

17. The collector of claim 16, wherein the scissor lift extension includes support wheels.

18. The collector of claim 17, wherein the scissor lift is connected to one of the plurality of retractable stages to move with the one of the plurality of retractable stages when extended.

19. A collector for collecting wash fluid from an engine washing operation, the collector comprising:
    a frame;
    a droplet separator package connected to the frame, the droplet separator package having a substantially vertical orientation to receive a flow of wash fluid entrained in an airstream emanating from an engine and being height adjustable;
    a droplet separator package lifting system, wherein actuation of the droplet separator package lifting system adjusts a height of the droplet separator package;
    a chute having a plurality of stages including a first stage and a second stage, the chute having a substantially horizontal orientation to collect fluid exiting the engine and being height adjustable, wherein the plurality of stages of the chute are extendable to adjust a length of the chute, and wherein the first stage of the chute is connected to the droplet separator package at a pivotal connection that causes a first end of the chute to move with the droplet separator package during height adjustment; and
    a lift, wherein the lift is connected to the second stage of the chute to move with the second stage when the length of the chute is adjusted, and wherein actuation of the lift adjusts a height and angle of a second end of the chute relative to the first end.

* * * * *

UNITED STATES PATENT AND TRADEMARK OFFICE
CERTIFICATE OF CORRECTION

PATENT NO. : 9,757,773 B2
APPLICATION NO. : 14/776450
DATED : September 12, 2017
INVENTOR(S) : Sebastian Nordlund, Robert M. Rice and Niklas Linderholm It is certified that error appears in the above-identified patent and that said Letters Patent is hereby corrected as shown below:

In the Claims

In Claim 3, at Column 7 in Line 52 please delete "wherein first crank" and insert --wherein the first crank--

In Claim 18, at Column 8 in Line 33 please delete "connected to one of the plurality" and insert --connected to one of a plurality--

Signed and Sealed this
Third Day of September, 2019

Andrei Iancu
*Director of the United States Patent and Trademark Office*